Nov. 17, 1936.  J. POWELL  2,061,210
CHECKROW TRANSPLANTING MACHINE
Filed Nov. 22, 1935  4 Sheets-Sheet 1
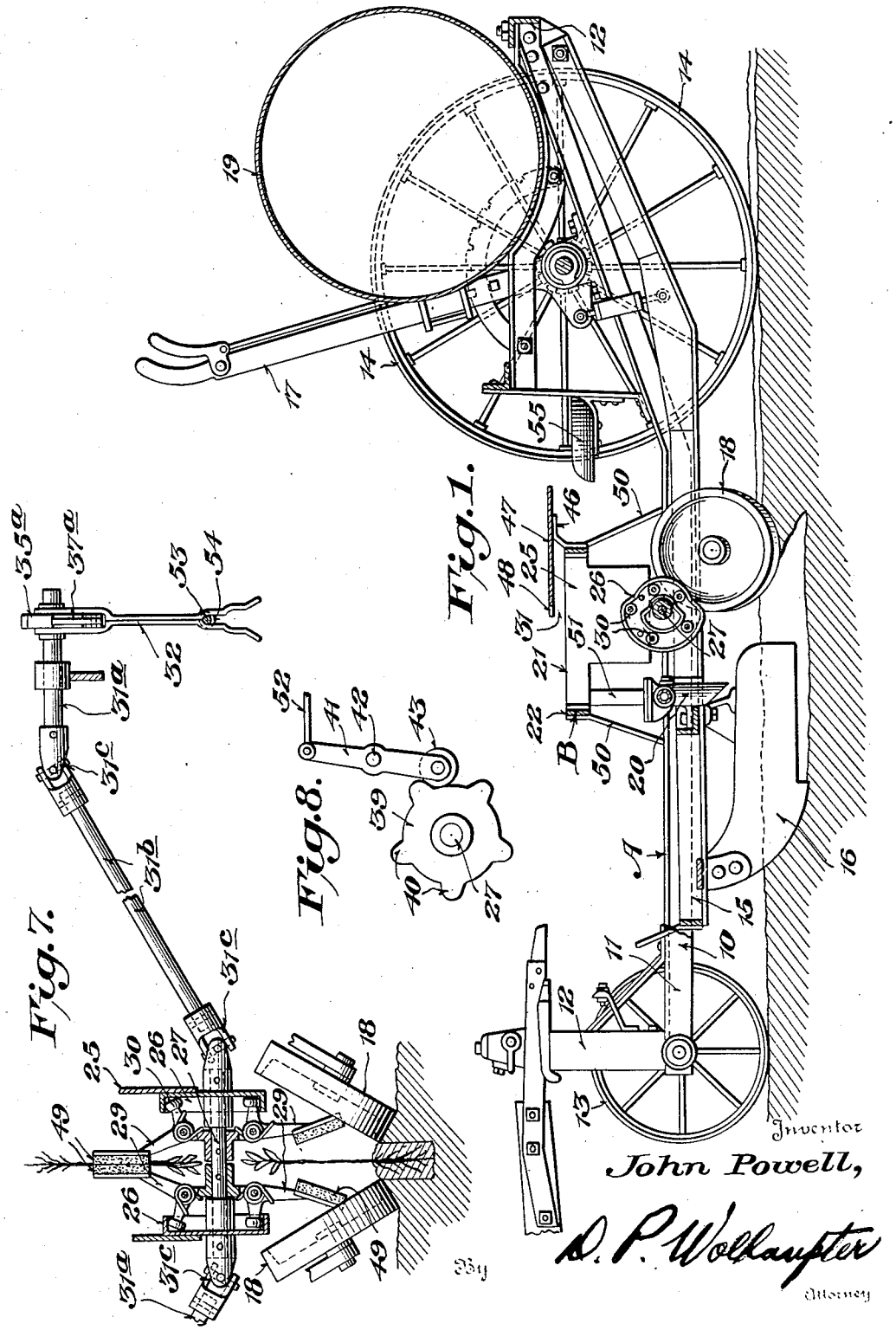
Inventor
John Powell,
D. P. Wolhaupter
Attorney

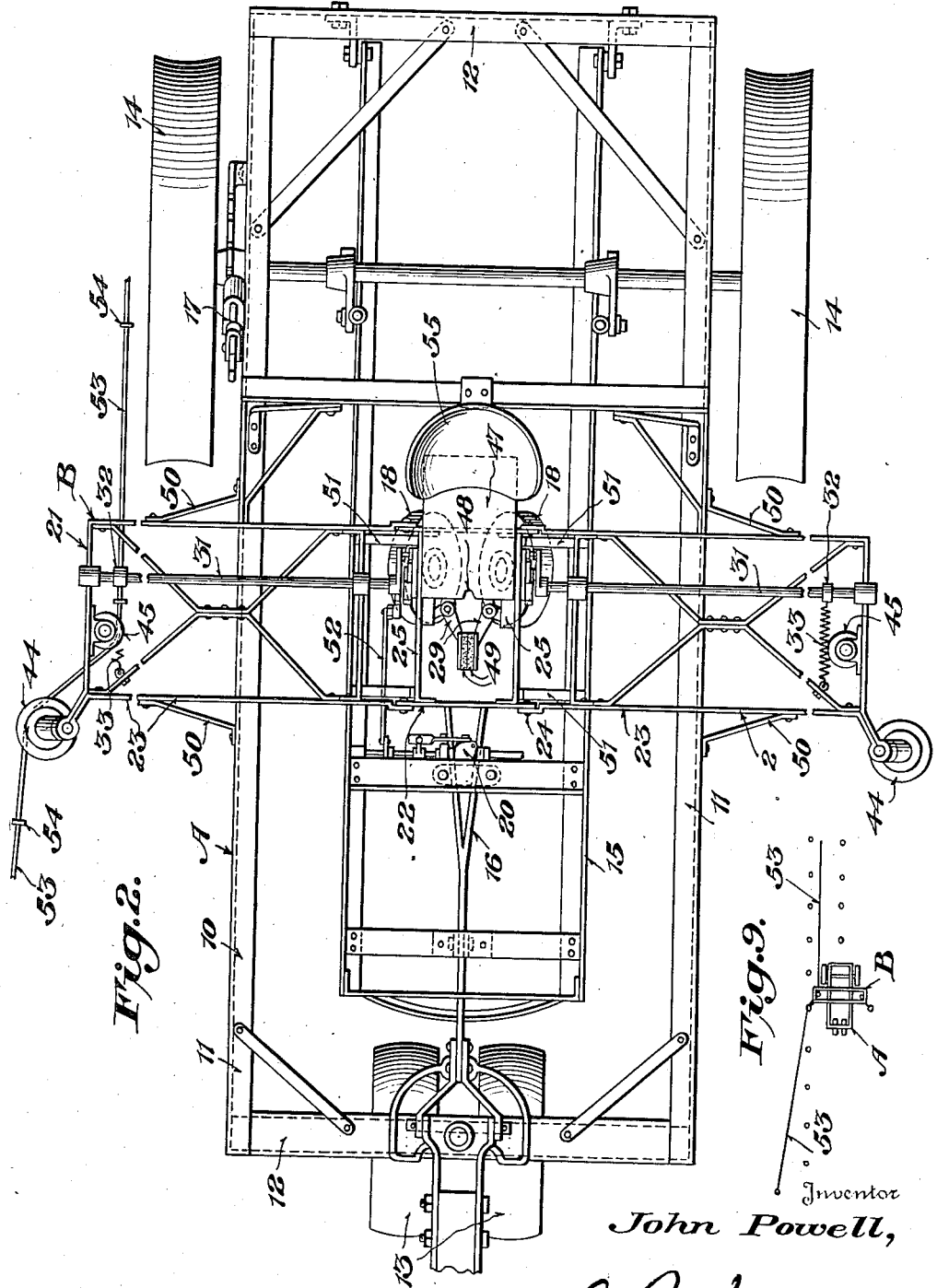

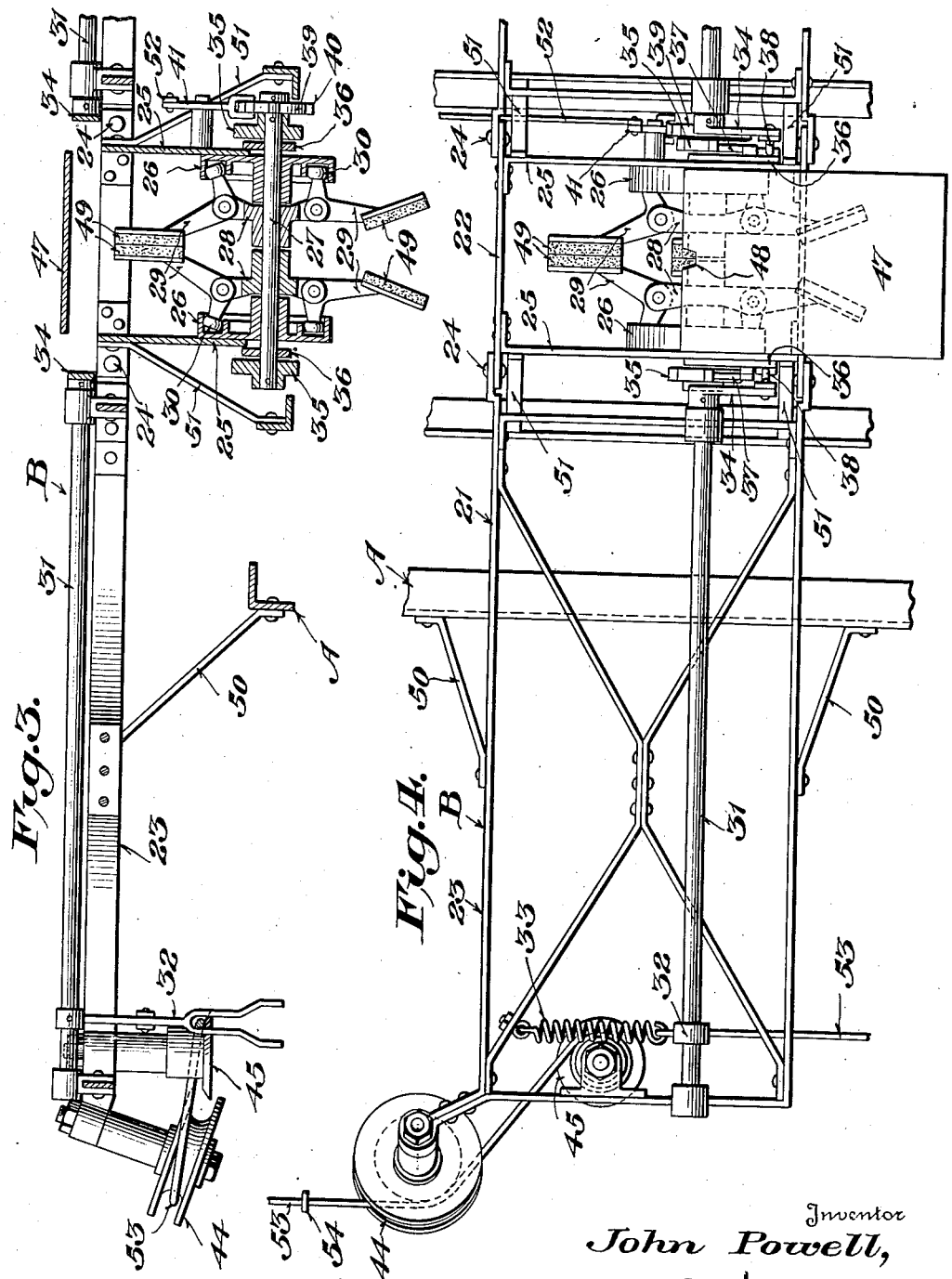

Nov. 17, 1936.　　　　J. POWELL　　　　2,061,210

CHECKROW TRANSPLANTING MACHINE

Filed Nov. 22, 1935　　　　4 Sheets-Sheet 4

Inventor
John Powell,
By
Attorney

Patented Nov. 17, 1936

2,061,210

UNITED STATES PATENT OFFICE 2,061,210

CHECKROW TRANSPLANTING MACHINE

John Powell, Kokomo, Ind.

Application November 22, 1935, Serial No. 51,158

9 Claims. (Cl. 111—3)

This invention relates to transplanting machines, and has generally in view to provide a simple, inexpensive, durable and thoroughly practical check row mechanism for such machines, which mechanism may either be built into the machines during their manufacture, or may be constructed as a unit for easy attachment to existing types of transplanting machines.

Practically all existing types of transplanting machines include a furrow opener, means operable periodically to apply water to the furrow at spaced intervals therealong where the plants are to be set, and means behind the furrow opener to fill in the trench about the set plants. A transplanting machine equipped with the present check row mechanism includes, in addition, an element disposed behind the furrow opener for rotation about a horizontal axis disposed transversely of the machine and having a plurality of pairs of radially disposed plant gripping arms to which the plants are supplied manually when said arms are in their uppermost positions and which operate to carry the plants downwardly to the furrow and to deposit them therein. In this connection an object of the invention is to provide check wire operated means to rotate said rotary element intermittently or step-by-step during continuous forward progress of the machine so as to bring the plant gripper arms successively to lowermost or plant depositing position, and to cause each pair of arms to pause in their lowermost position and at the same time to release the plant and to remain paused until the machine has advanced sufficiently far not only to fill in the trench about the deposited plant, but to avoid any possibility of contact of the arms with the deposited plant when the arms swing upwardly. Also, in this connection an object of the invention is to provide means whereby the plants are set at the points where the water is applied to the furrow.

In a transplanting machine it is desirable that the furrow opener shall be mounted for vertical movement so that it may be raised above the ground when it is not desired that it shall cut a furrow and so that the depth of the furrow may be varied. In this connection another object of the invention is to mount the plant setting means for vertical movement with the furrow opener so that a desired operative relationship between these parts may be maintained and so that an operative connection may be provided between the plant setting means and the water application control valve which is carried by the furrow opener, thereby to assure that the plants are set at the points where water is applied to the furrow.

According to the invention a check wire is employed to control operation of the water applying and plant setting means. At the beginning of setting of a row of plants the machine is disposed at one end of a field and the check wire extends from the machine across the row of plants last set to the other end of the field. In this connection an object of the invention is to provide for lifting the check wire over the plants of the last set row as the machine is advanced, thereby to avoid harming of the plants by the check wire.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a central, vertical, longitudinal section through a transplanting machine equipped with a check row mechanism in accordance with one practical embodiment of the invention.

Figure 2 is a top plan view of the machine shown in Fig. 1.

Figure 3 is an enlarged longitudinal section through the check row mechanism.

Figure 4 is an enlarged plan view of the check row mechanism.

Figure 7 is a view similar to Fig. 3 illustrating an alternative embodiment of the invention.

Figure 8 is a detail view illustrating the water valve actuating means, and

Figure 9 is a diagram illustrating the manner of using a transplanting machine equipped with the present check row mechanism.

Figure 5:
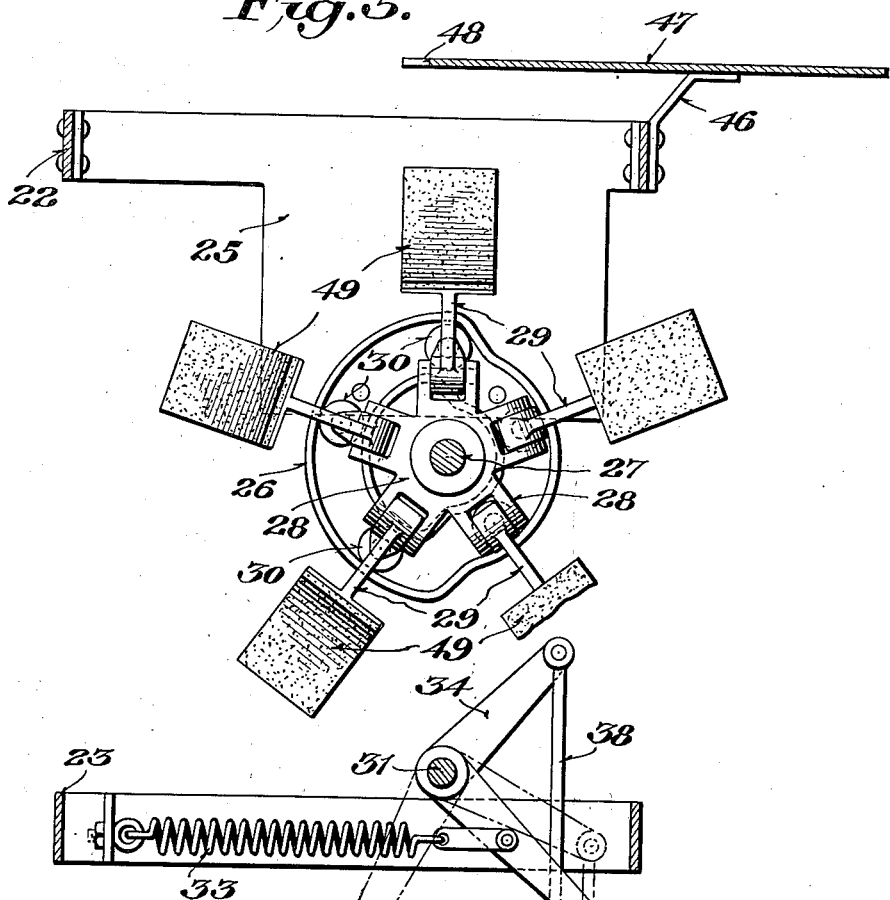
Figure 5 is a central, transverse section through the check row mechanism.
Figure 6:
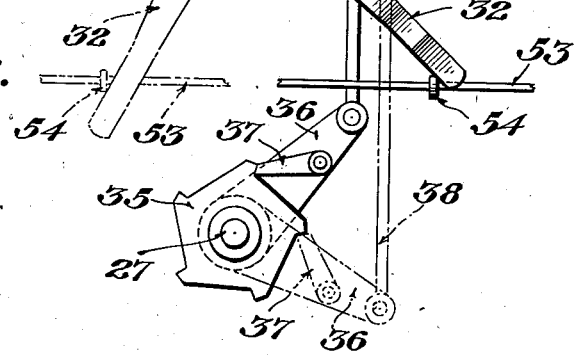
Figure 6 is a transverse section through the check row mechanism showing the check wire operated means for intermittently rotating the plant gripping means.

Referring to the drawings in detail, A designates, generally, a transplanting machine having embodied therein a check row mechanism constructed in accordance with the invention and designated generally as B. As previously indicated, the check row mechanism may comprise part of an originally constructed machine A specially designed to include said mechanism, or it may be constructed as a unit for attachment to known types of transplanting machines. Moreover, as is understood, the purpose of the check row mechanism is to assure the placing of plants at equally spaced intervals in the rows with the plants of the different rows laterally alined or forming rows at right angles to the first mentioned rows so that cross cultivation is possible.

The machine A is of a known type comprising a rectangular main frame 10 composed of side rails 11 connected together by end rails 12; front steering wheels 13 and rear wheels 14 supporting said main frame; an auxiliary frame 15 disposed within the main frame 10 and hinged at its rear end to the rear end of the main frame for vertical swinging movement relative to said main frame; a furrow opener 16 mounted on the auxiliary frame near the front end thereof; a lever 17 for raising and controlling lowering of the auxiliary frame relative to the main frame for the purpose of raising the furrow opener above the ground when it is desired that a furrow shall not be cut, and of controlling the depth at which the furrow opener operates, thereby to predetermine the depth of the furrow; a pair of pack wheels 18 mounted on the auxiliary frame behind the furrow opener for the purpose of filling in the furrow as the machine advances; a water tank 19 mounted on the main frame, and a valve 20 having a water supply connection with the tank 19 and mounted on the furrow opener at the rear end thereof for operation to control the application of water to the furrow.

The check row mechanism B comprises an articulated, elongated, rectangular frame 21 composed of a short length middle section 22 and two longer end sections 23, 23 pivotally connected at their inner ends, as at 24, to the related ends of the middle section; a pair of plates 25, 25 forming, or attached to, the ends of the middle section and depending from the frame 21; a pair of cam elements 26, 26, rigid with said plates 25, 25, respectively; a shaft 27 rotatably mounted in said cam elements and extending horizontally therebetween; a pair of spider elements 28, 28 keyed or otherwise mounted on said shaft against rotation or longitudinal movement relative thereto; a plurality of bell-crank arms 29 pivotally mounted on each spider element on axes at right angles to the axis of the shaft 27 and spaced apart equal angular distances around said shaft with related arms of the respective spider elements alined with each other; rollers 30 on the shorter arms of each set of the bell-crank arms cooperating with the related cam element 26 so that by rotation of the bell-crank arms with the shaft 27 the longer arms of each related pair of the bell-crank arms are caused to move toward or away from each other, depending upon the shape of the cam elements 26, 26 which are right and left hand duplicates of each other and which are so shaped that the longer arms of each related pair of the bell-crank levers are caused to be moved toward each when they reach a position substantially directly above the shaft 27, to remain in this position during their downward travel until they reach a position substantially directly below the shaft 27, and then to move away from each other and to remain spaced apart during their upward travel until they reach the first mentioned position substantially directly above the shaft 27 where they again are moved toward each other.

The check row mechanism B further comprises a shaft 31 individual to each end frame section 23 and extending substantially from end to end thereof, each shaft being mounted for rotation in suitable bearings on its related frame section; an arm 32 fixed on and depending from the outer end portion of each shaft 31 and having its lower end bifurcated for check wire reception; a spring 33 individual to each arm 32 tending constantly to swing the same forwardly to a substantially vertical position; an arm 34 fixed on and extending normally laterally from the inner end portion of each shaft 31; a ratchet wheel 35 fixed on each end portion of the shaft 27; an arm 36 rotatably mounted on each end portion of the shaft 27 and having a pawl 37 cooperating with the related ratchet wheel 35, and a link 38 connecting each arm 34 with the related arm 36.

The number of teeth on the ratchet wheels 35 correspond to the number of pairs of the bell-crank arms 29. Thereby, each time either of the arms 32 is swung rearwardly and is subsequently released and moved forwardly by its spring 33, the ratchet mechanism operates to impart to the shaft 27 and to the plurality of pairs of bell-crank arms 29 carried thereby one step of forward rotation through an angle corresponding to the angle between adjacent pairs of the bell-crank arms, the rest or stop position of the shaft 27 always being such that one pair of the arms 29 depends vertically, or substantially vertically from said shaft and another pair of said arms extend vertically, or substantially vertically, above said shaft.

Mounted on one end of the shaft 27 is a cam disk 39 having a plurality of protuberances 40 corresponding in number to the number of pairs of the bell-crank arms. A lever 41 is pivoted intermediate its ends, as at 42, to the middle section 22 of the frame B and at one end carries an anti-friction roller 43 for cooperation with the protuberances 40 of the cam disk 39, the arrangement of said cam disk 39 with respect to the ratchet wheels 35 being such that the lever 41 is rocked once during each step of advance of the plurality of bell-crank arms carried by the shaft 27.

At the outer, forward corner of each of the end sections 23 of the frame B is mounted a substantially horizontally disposed, grooved check wire guide sheave 44. Also mounted on an outer end portion of each end section 23 of the frame B, behind the related sheave 44 and in front of the bifurcated lower end portion of the related arm 32, is a flanged, check wire supporting and guiding roller 45.

On a bracket, or brackets 46, carried by the middle section 22 of the frame B is mounted a plate 47 which is disposed horizontally above said middle frame section and has in its forward edge, which substantially overlies the shaft 27, a notch 48 for the guidance of the operator in holding a plant in position to be grasped between a pair of the bell-crank arms 29 as the latter reach a substantially vertically disposed position above the shaft 27 and are moved together. On the adjacent faces of the longer arms of the bell-crank levers are pads 49 of sponge rubber or other soft, yieldable material for gripping and holding the stems of the plants without bruising or harming them.

Whether the described check row mechanism is built into the machine A as originally constructed, or is constructed as a unit for application to transplanting machines of known types, it may be mounted on the transplanting machine in any suitable or desired manner. For example, in the case of the particular type of transplanting machine A illustrated in the present instance, the check row mechanism B extends transversely across the main and the auxiliary frames 10 and 15 of the transplanting machine, behind the furrow opener 16 and above or suitably in advance of the pack wheels 18, and is mounted on said main and auxiliary frames 10, 15, at a suitable elevation above the main frame, by means of rods or struts 50 extending upwardly and outwardly from the side rails 11 of the main frame to the side rails of the respective end frames 23, 23 of the check row mechanism, and by means of rods or struts 51 extending upwardly and inwardly from the side rails of the auxiliary frame 15 to the ends of the middle 22 of the frame B of the check row mechanism. In this way the check row mechanism is, or may be, mounted firmly on the transplanting machine A. At the same time, due to the articulated or pivotal relationship between the middle and the end sections of the frame B, it is manifest that the auxiliary frame 15 of the transplanting machine is free to be raised and lowered relative to the main frame 10 of the machine, there being in this connection, if necessary, pivotal and sliding connections between the rods or struts 50 and the side rails of the frame B to permit the outer sections 23 of said frame to tilt and slide with raising and lowering of the middle section 22 with the auxiliary frame 15.

The water valve 20 is or may be of any suitable or known type. It is spring-closed and is connected by a rod 52 with the lever 41 so that each time said lever is rocked by one of the protuberances 40 on the cam disk 39 the valve is opened to apply water to the furrow. Moreover, the relationship of the protuberances on the cam disk to the teeth on the ratchet wheels 35 and to the spacing of the shaft 27 behind the water valve is such that as the machine advances the successive pairs of bell-crank arms reach their lowermost positions and are moved apart to release the plants at the points where water has been applied to the furrow.

The diagram, Fig. 9, illustrates the manner in which a check wire is employed to actuate the check row mechanism during planting of a row of plants. Assuming that one or more rows of plants have been planted and that the machine is at one end of a field ready to plant the next row, the check wire 53 is staked or otherwise suitably fastened at a point behind the machine, approximately midway between the row last planted and the row to be planted, and extends forwardly through the bifurcated lower end of the arm or lever 32 at the side of the machine adjacent to the row last planted, over the flange of the related guide roller 45 and outwardly around the outer side of the related sheave 44, thence to the other end of the field, diagonally across the row last planted to the anchorage approximately midway between the row last planted and the planted row next adjacent thereto, which was the staked or starting position of the check wire for the planting of the last row when the machine was at the opposite end of the field. Now, as the machine is advanced, the arm or lever 32 travels along the check wire and successively encounters the buttons 54 on said wire which are arranged at predetermined spaced intervals therealong. When a button is encountered by the arm 32, preventing the arm from advancing freely along the check wire, the arm of necessity is caused to swing rearwardly. The related shaft 31 thus is rotated and through the pawl and ratchet mechanism at the inner end of said shaft the plurality of bell-crank arms 29 have imparted thereto one step of forward rotation, the button on the check wire then passing by the upwardly swung lower end portion of the arm 32 and said arm being returned by its spring 33 to its starting position ready to repeat the operation when the next button is encountered.

As heretofore stated, each pair of the bell-crank arms are relatively open or spaced apart as they approach their uppermost position and upon reaching their uppermost position are moved together or relatively closed. At the same time, each downwardly traveling pair of bell-crank arms are maintained closed until they reach their lowermost position and upon reaching their lowermost position are moved apart or opened. On the frame B or at any other suitable location is supported a box, basket or the like containing the plants to be planted, and on a seat 55 behind the frame B is seated the operator who supplies the plants to the check row mechanism. In other words, each time a pair of the bell-crank arms approach their uppermost position the operator holds a plant, roots upward, in position so that the stem of the plant will be grasped between the pads of the arms as the arms move together, this operation being facilitated by the plate or table and by the notch in the front edge thereof. In the meantime, a plant gripped by a previous pair of the arms is carried downwardly and is released, roots downward, in the furrow cut by the furrow opener at a point where water has been applied due to operation of the valve 20 simultaneously with each step of advance of the plurality of plant gripper arms. During these operations the machine is, of course, advancing, so that as each plant is set in the furrow the pack wheels 18 operate to fill in the furrow therearound. These operations are repeated each time a button on the check wire is encountered by the arm 32, so that the plants are set at spaced intervals along the row corresponding to the spacing of the buttons along the check wire. When the machine reaches the end of the field, it is turned, the end of the check wire is shifted and the machine then is in readiness to travel to the first mentioned end of the field.

The purpose in having duplicate pawl and ratchet mechanisms at opposite ends of the check row mechanism, or, in other words, at each side of the transplanting machine, is, of course, to permit the machine to be used to plant successive rows toward either the right or the left hand side or end of a field, the operations being the same in either case. In this connection, since the check wire always extends diagonally across the row last planted, said wire would, if dragged across the plants of the last planted row by forward travel of the machine, be very likely to break off or otherwise damage said plants. The guide sheaves 44 disposed well above the ground provide, however, for lifting the check wire over the plants of the last planted row as the machine advances so that the plants are in no way harmed by the check wire.

Figure 7 of the drawings illustrates an alternative form of means for driving the gripper arm carrying shaft 27. Instead of mounting ratchet wheels on said shaft 27, short length shafts 31$^a$ are connected with the shaft 27 by intermediate shafts 31$^b$ having universal joint connections 31$^c$ with said shafts 31$^a$ and 27, and on each short length shaft 31$^a$ is fixed a ratchet wheel 35$^a$ with which cooperates a pawl 37$^a$ carried directly by the related arm 32ª. In other respects the construction is, or may be, the same as illustrated in Figs. 1 to 5.

Regarding the cams 26, it will be observed that the same are illustrated in the present instance as having channels which cooperate with the rollers on the shorter ends of the bell-crank arms both to open and close each pair of said arms. Obviously, however, spring means may be employed to close said arms and the cams may be designed merely to open the arms at desired times. Moreover, while the mechanism considered as an entirety has been illustrated and described for check wire operation, it is obvious that the same may be driven, if desired, by suitable gearing directly from the wheels 14.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A transplanting machine comprising a frame, a furrow opener mounted on said frame, means on said frame behind the furrow opener for filling the furrow, a secondary frame mounted on the machine and extending transversely relative thereto, a horizontally disposed shaft mounted on the secondary frame transversely of the machine, a plurality of pairs of plant gripping arms radiating from said shaft, check wire operated means for rotating said shaft and gripping arms intermittently as the machine advances, cam means with which said gripping arms cooperate during their rotation to cause said arms positively to be moved together when they reach substantially their uppermost positions to grip a plant and to cause said arms positively to move away from each other to release the plant when the arms reach substantially their lowermost position, said shaft and arms being located to deposit plants in the furrow behind the furrow opener and in advance of the furrow filling means, and a table mounted on the secondary frame and having one edge thereof substantially overlying the gripper arm carrying shaft, said edge of said table having means for the guidance of the operator in holding a plant to be gripped by the gripping arms.

2. A transplanting machine comprising a main frame, an auxiliary frame mounted on said main frame for vertical movement relative thereto, a furrow opener on the auxiliary frame, furrow closing means on the auxiliary frame behind the furrow opener, a secondary frame comprising a middle section and a pair of end sections hinged thereto, said secondary frame extending transversely of the machine above said main and auxiliary frames, the middle section of said secondary frame being mounted on the auxiliary frame and the end sections being mounted on the main frame, a shaft carried by the middle section of the secondary frame and extending horizontally transversely of the machine, a plurality of pairs of bell-crank arms mounted on said shaft on axes at right angles thereto, a pair of cams on said middle section cooperating with said bell-cranks during their rotation with said shaft to move corresponding arms of each pair of bell-cranks together to grip a plant when the arms reach substantially their uppermost position, and to move said arms apart to release a plant and deposit it in the furrow when the arms reach substantially their lowermost position, and check wire operated ratchet means on each end section of the secondary frame connected with said shaft for imparting intermittent rotation thereto during advance of the machine.

3. A transplanting machine as set forth in claim 2 in which the check wire operated means for rotating the bell-crank carrying shaft comprises a ratchet wheel on each end of said shaft, a lever loose on each end of said shaft having a pawl cooperating with its related ratchet wheel, a horizontal shaft on each end section of the secondary frame extending longitudinally of its related end section, an arm on the inner end of each last mentioned shaft linked to the arm on the first mentioned shaft, an arm depending from the outer end of each last mentioned shaft and bifurcated at its lower end for check wire reception, spring means for urging each last mentioned arm forwardly, and means on the outer end of each end section of the secondary frame for lifting the check wire and guiding it through the bifurcated lower end of the related last mentioned lever.

4. A transplanting machine as set forth in claim 2 including water supply means having a valve for controlling application of water to the furrow, a cam disk on the bell-crank carrying shaft, and a connection between said disk and said valve whereby the latter is opened each time the ratchet mechanism operates to advance the series of bell-cranks.

5. A transplanting machine comprising a main frame, an auxiliary frame mounted on said main frame for vertical movement relative thereto, a furrow opener on the auxiliary frame, furrow closing means on the auxiliary frame behind the furrow opener, a secondary frame comprising a middle section and a pair of end sections hinged thereto, said secondary frame extending transversely of the machine above said main and auxiliary frames, the middle section of said secondary frame being mounted on the auxiliary frame and the end sections being mounted on the main frame, a shaft carried by the middle section of the secondary frame and extending horizontally transversely of the machine, a plurality of pairs of bell-crank arms mounted on said shaft on axes at right angles thereto, a pair of cams on said middle section and cooperating with said bell-cranks during their rotation with said shaft to move corresponding arms of each pair of bell-cranks together to grip a plant when the arms reach substantially their uppermost position, and to move said arms apart to release a plant and deposit it in the furrow when the arms reach substantially their lowermost position, and means operated by forward movement of the machine to drive said shaft.

6. A transplanting machine comprising a main frame, an auxiliary frame mounted on said main frame for vertical movement relative thereto, a furrow opener on the auxiliary frame, furrow closing means on the auxiliary frame, a secondary frame comprising a middle section and a pair of end sections hinged thereto, said secondary frame extending transversely of the machine above said main and auxiliary frames, the middle section being mounted on the auxiliary frame and the end sections being mounted on the main frame, a shaft on the middle section, plant gripping, carrying and depositing means on said shaft, a check-wire operable shaft on each end section, and a driving connection between each last mentioned shaft and the shaft on said middle sections.

7. A transplanting machine comprising a main frame, an auxiliary frame mounted on said main frame for vertical movement relative thereto, a furrow opener on the auxiliary frame, furrow closing means on the auxiliary frame, a secondary frame comprising a middle section and a pair of end sections hinged thereto, said secondary frame extending transversely of the machine above said main and auxiliary frames, the middle section being mounted on the auxiliary frame and the end sections being mounted on the main frame, a shaft on the middle section, plant gripping, carrying and depositing means on said shaft, a shaft on each end section, a pawl and ratchet connection between each last mentioned shaft and said first mentioned shaft, means on the shafts of said end sections for selective check wire actuation to impart partial rotation to the selected one of said shafts intermittently as the machine advances, and means for returning the selected one of said shafts to a starting position following each check wire imparted partial rotation thereof.

8. A transplanting machine as set forth in claim 6 including means having a valve for the supply of water to the furrow, a cam on the shaft of the middle secondary frame section, and an operative connection between said cam and said valve whereby the valve is periodically opened by said cam.

9. A transplanting machine as set forth in claim 6 including means having a valve for the supply of water to the furrow, and an operative connection between the shaft on the middle secondary frame section and said valve whereby the valve is periodically opened by rotation of said shaft.

JOHN POWELL.